United States Patent Office 2,722,399
Patented Nov. 1, 1955

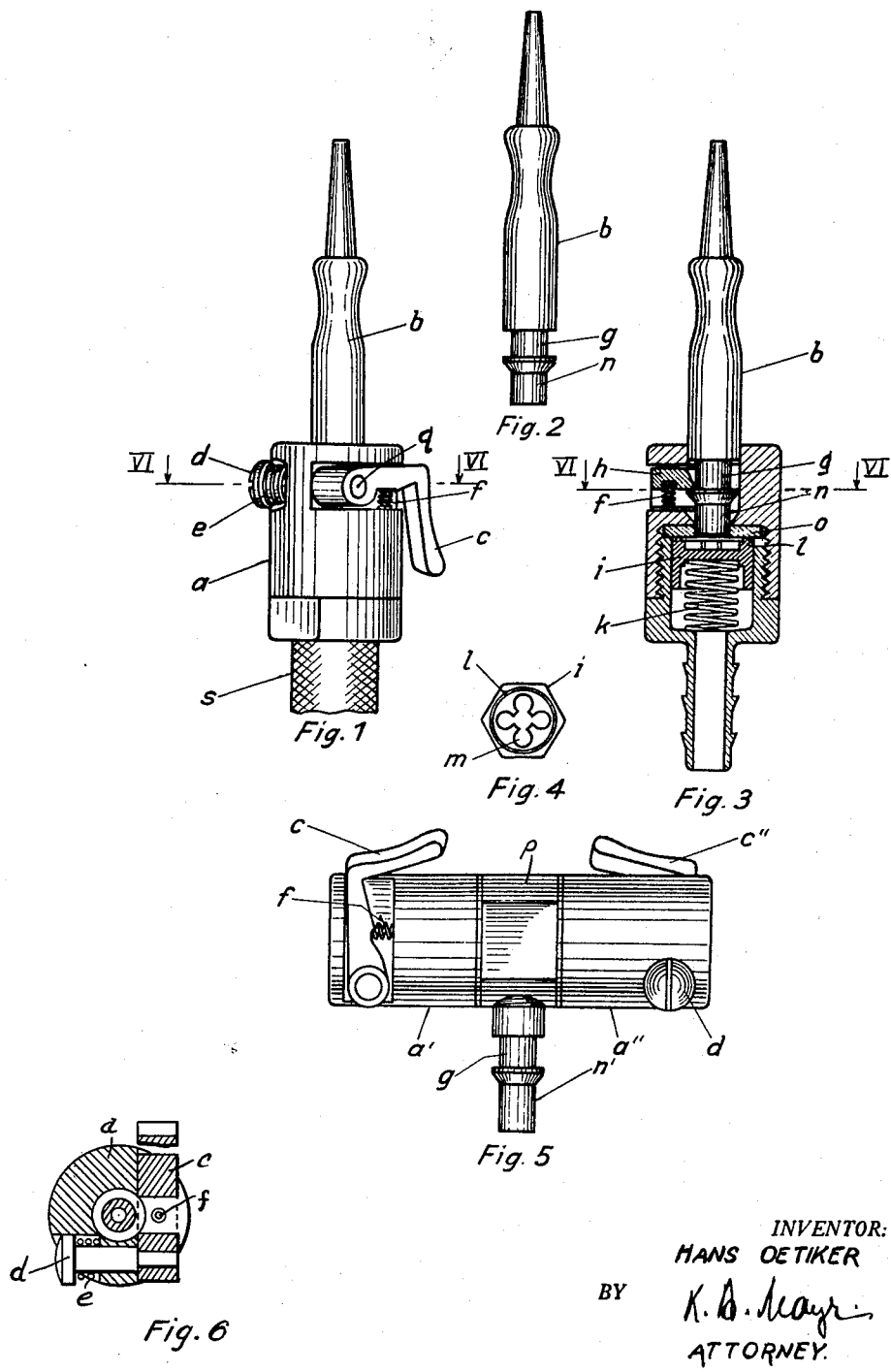

2,722,399

COMBINED COUPLING AND VALVE FOR COMPRESSED AIR CONDUITS

Hans Oetiker, Horgen, near Zurich, Switzerland

Application August 5, 1950, Serial No. 177,809

Claims priority, application Switzerland August 6, 1949

3 Claims. (Cl. 251—149)

The invention concerns a combined coupling and valve for compressed air conduits which consists of two disconnectable parts that are connected together by being fitted into each other, one of these parts being constructed as a coupling member and possessing a spring-loaded valve and a control device for the passage of the air, whilst the other part is a conduit which may be in the form of a blow tube which is fitted into the coupling member.

The union between the blow tube and the coupling member can be established in an advantageous manner by providing an end portion of the blow tube with a recess in which a spring-loaded catch engages, which latter, for the purpose of uncoupling the blow tube, can be pressed transversely out of the recess.

When it is desired to control the valve by means of a manually operated control lever, the length of the end portion of the blow tube is made so that, when the blow tube is fitted into the coupling, the end of the tube does not reach the closing cap of the valve and opens the latter only if, with the aid of a control device, the blow tube is moved a further distance into the coupling member, so that without this movement the valve remains closed. The control operation is as follows:

Upon movement of the control lever, the catch which engages the recess in the end portion of the conduit member pulls the latter further into the coupling. This movement of the control lever is opposed by a spring, which, when the control lever is released, moves the conduit member or blow tube back so far that a spring which acts on the closing cap of the valve closes the latter.

In order to attain an absolutely certain closure of the valve, a sealing ring is provided against which the closing cap is pressed by the valve closing spring, whereby to ensure a better seal the closing cap is provided with an annular projection which shuts off the pressure chamber hermetically from the atmosphere.

It is very important that with the relatively small opening movement of the closing cap, the passage of the air through the valve should be throttled as little as possible. This can be achieved by providing the closing cap with several communicating recesses which when the valve is open enable an adequate supply of air to reach the blow pipe.

If the air blast is to last for some time, then in order to relieve the operator, a locking device can be provided which fixes the control lever in the air releasing position. If the valve does not have to be closed at all, the end portion of the blow tube can be made so long that it keeps the closing cap of the valve continuously lifted without having to use the control device.

In such cases where the compressed air is supplied to several consumer points from a common pressure hose, a fitting in the form of a distributor may be made up of a plurality of coupling elements of the kind described. Whatever the nature of the element which is to be connected to the coupling, whether it is a blow tube, a fitting or a pressure pipe, the element must always be equipped with an end portion which matches the coupling.

The invention is now explained by means of the constructional examples shown in Figs. 1 to 5.

Fig. 1 shows a combined coupling and valve according to the invention.

Fig. 2 shows the conduit member in the form of a blow tube withdrawn from the coupling member of the coupling of Fig. 1.

Fig. 3 is a longitudinal section of Fig. 1.

Fig. 4 is a top view of the closing cap of the valve.

Fig. 5 shows a combination of three couplings according to the invention, the conduit member of only one coupling being shown.

Fig. 6 is a transverse sectional view of the device according to the invention, the section being taken along lines VI—VI of Figs. 1 and 3.

In the figures:

$a$ designates the coupling member of the compressed air coupling, $b$ designates the conduit member in the form of a straight blow tube removably fitted into $a$ and formed with an end portion $n$, $c$ designates the control lever which controls the device for regulating the air flow valve and is mounted on a pivot $q$ which is slidably mounted transversely in the coupling member $a$, $d$ designates an actuating button for the pivot of lever $c$ for disengaging the spring-loaded spring catch $h$ which normally engages the recess of the conduit member $b$, $e$ designates a spring bearing against the button $d$ and urging the catch into engagement with the conduit member $b$, $f$ designates a spring acting on the control lever $c$, $g$ designates the recess in the conduit member engaged by a portion of lever $c$, $i$ designates the closing cap of the valve, $k$ designates a spring acting on the closing cap for the purpose of closing the valve.

When the blow tube $b$ is inserted into the coupling $a$, catch $h$ forming part of a lever $c$ swinging on a pivot whose end is provided with a button $d$ slips into the recess $g$, due to the action of spring $e$, and thus keeps the blow tube connected with the coupling. If the blow tube is to be detached, the catch can be pushed out of the recess by pressing on the button $d$ and moving the pivot of lever $c$ to the right as seen in Fig. 6 and the blow tube can be pulled out of the coupling. After the blow tube has been inserted, it can be pushed further into the coupling by depressing the control lever $c$. This movement serves to introduce the end portion $n$ so far into the coupling that its end pushes away the closing cap $i$ and thus opens the valve so that the compressed air can flow out.

Fig. 3 serves to explain the operation in more detail. This figure which is a longitudinal section of the coupling, shows how the catch $h$ projects into the recess $g$ in the end portion $n$. Upon downward movement of catch $h$ caused by depressing the control lever $c$, the end portion $n$ is pressed against the closing cap $i$ of the valve which, after overcoming the force of spring $k$, is lifted from the sealing ring $o$. The compressed air can then flow freely and enter the blow tube.

In order to block the passage of the air the control lever is released. The catch $h$ is then pressed upwards by spring $f$ and the closing cap is seated by spring $k$.

Fig. 4 shows a particularly favorable construction for the closing cap $i$. Reference letter $m$ indicates communicating recesses which, when the valve is opened, enable the air to pass into the blow tube in an adequate manner. A circular projection $l$ which, when the valve is closed, abuts tightly against the sealing ring $o$, serves to close off the compressed air chamber hermetically from the atmosphere.

Fig. 5 illustrates the possibility of connecting several consumer points to the same compressed air pipe. Instead of the blow tube, a fitting $p$ provided with a conduit corresponding to the lower end of the blow tube shown in Fig. 2 is inserted into a coupling part (not shown) of the type illustrated in Figs. 1 and 3 and connected with the compressed air pipe which is not shown. The lateral outlet openings of the fitting are individually connected with couplings $a'$ and $a''$ of the kind described, into which pipe connections (not shown) having ends shaped like the lower end of the blow tube shown in Fig. 2 can be individually fitted and compressed air can be supplied to different places simultaneously but independently of each other. The outer end $n'$ of the conduit fitted into member $p$ is preferably made longer than the end portion $n$ of the blow tube shown in Figs. 2 and 3 so that it holds the valve of the coupling, to which the conduit is connected, in open position. Air supply to the conduits connected to the couplings $a'$ and $a''$ can be individually controlled by manipulation of the control levers $c'$ and $c''$.

I claim:

1. A combined coupling and valve for compressed air conduits comprising a coupling member having an axial bore, an axially movable spring-loaded valve member in said bore adapted to engage a valve seat formed therein to close off fluid flow through said bore, a conduit member disposed coaxially with and axially movable in said bore and having an end portion abutting said valve member for actuating said valve member to a valve open position in which the conduit member is in fluid flow communication with said bore, a recess in the outer wall of said conduit member, an actuating lever pivotally mounted on said coupling member and having a portion engaging said recess, a spring interposed between said lever and said coupling member urging the lever in a direction such that the conduit member is moved away from the valve member permitting said valve member to engage the valve seat, and said lever being transversely movable outwardly relatively to said axial bore for disengagement from said recess and release of the conduit member.

2. A combined coupling and valve for compressed air conduits comprising a coupling member having an axial bore, an axially movable spring-loaded valve member in said bore adapted to engage a valve seat formed therein to close off fluid flow through said bore, a conduit member disposed coaxially with and axially movable in said bore and having an end abutting said valve member for actuating said valve member to a valve open position in which the conduit member is in fluid flow communication with said bore, a recess in the outer wall of said conduit member, a pivot axially movably mounted on said coupling member at a right angle to the axial bore, an actuating member rigidly secured to said pivot and having a portion engaging said recess in one extreme position of said pivot and being out of engagement with said recess when said pivot is in its other extreme position for releasing said conduit member and affording withdrawal thereof from said coupling member.

3. A combined coupling and valve for compressed air conduits as defined in claim 2, comprising a spring interposed between said pivot and said coupling member for yieldingly holding said pivot in its first extreme position.

References Cited in the file of this patent

UNITED STATES PATENTS

| Number | Name | Date |
|---|---|---|
| 999,169 | Jones | July 25, 1911 |
| 1,092,673 | Stephens | Apr. 7, 1914 |
| 1,551,439 | Stoms | Aug. 25, 1925 |
| 1,664,816 | Hansen | Apr. 3, 1928 |
| 1,677,446 | Hartmetz | July 17, 1928 |
| 1,728,756 | Hansen | Sept. 17, 1929 |
| 1,948,852 | Gilfoy | Feb. 27, 1934 |
| 2,369,356 | Koehn | Feb. 13, 1945 |